US008355932B2

(12) United States Patent
Malackowski et al.

(10) Patent No.: US 8,355,932 B2
(45) Date of Patent: Jan. 15, 2013

(54) SYSTEM AND METHOD FOR MANAGING INTELLECTUAL PROPERTY-BASED RISKS

(75) Inventors: James E. Malackowski, Chicago, IL (US); Robert Block, Chicago, IL (US); Andrew W. Carter, Chicago, IL (US); Adam Clifford, Chicago, IL (US); Richard Conroy, Chicago, IL (US); Michael O. Hill, Chicago, IL (US); Michael Lasinski, Chicago, IL (US)

(73) Assignee: Ocean Tomo LLC, Chicago, IL (US)

( * ) Notice: Subject to any disclaimer, the term of this patent is extended or adjusted under 35 U.S.C. 154(b) by 420 days.

(21) Appl. No.: 12/589,113

(22) Filed: Oct. 16, 2009
(Under 37 CFR 1.47)

(65) Prior Publication Data

US 2010/0169127 A1    Jul. 1, 2010

Related U.S. Application Data

(63) Continuation-in-part of application No. 11/744,699, filed on May 4, 2007, and a continuation-in-part of application No. 11/401,095, filed on Apr. 10, 2006, now abandoned.

(60) Provisional application No. 60/746,388, filed on May 4, 2006, provisional application No. 60/669,793, filed on Apr. 8, 2005.

(51) Int. Cl.
*G06Q 40/00* (2012.01)
(52) U.S. Cl. ........................................................ 705/4
(58) Field of Classification Search ........................ None
See application file for complete search history.

(56) References Cited

U.S. PATENT DOCUMENTS

| | | | |
|---|---|---|---|
| 6,556,992 B1 | 4/2003 | Barney et al. | |
| 7,216,100 B2 | 5/2007 | Elliott | |
| 7,228,288 B2 | 6/2007 | Elliott | |
| 7,269,566 B2 | 9/2007 | Elliott | |
| 7,353,202 B2 | 4/2008 | Malackowski | |
| 2002/0002524 A1* | 1/2002 | Kossovsky et al. | 705/36 |
| 2002/0077870 A1* | 6/2002 | Wilkinson | 705/4 |
| 2004/0010393 A1 | 1/2004 | Barney | |
| 2004/0220842 A1 | 11/2004 | Barney | |

OTHER PUBLICATIONS

Ernest & Young LLP. Federal Income Taxation of Property and Casualty Insurance Companies. John Wiley & Sons. 1996. p. 356.*
Bird, Pamela Riddle. Inventing for Dummies. Wiley Publishing. May 2004. pp. 52-54.*
Stanzler, J.S. Mind Your Qs an IPs, IP Worldwide, An American Lawyer Media Publication, Sep. 1999.

* cited by examiner

*Primary Examiner* — Jason M Borlinghaus
(74) *Attorney, Agent, or Firm* — Valauskas Corder LLC

(57) ABSTRACT

Presented herein are methods and systems for managing an entity's risks of patent coverage. More specifically, the present invention is directed to methods and system for insuring an entity against damage awards in patent litigation. The presented methods and systems allow a manufacturer to minimize their exposure to damage awards in patent litigation by conducting pre-emptive analyses and properly allocating funds for royalty payments and/or damage awards. An insurance captive is also established as a risk management tool to insure the manufacturer against excessive damage awards.

25 Claims, 7 Drawing Sheets

SYSTEM AND METHOD FOR MANAGING INTELLECTUAL PROPERTY-BASED RISKS

PRIORITY CLAIM

This application is a continuation-in-part of U.S. application Ser. No. 11/744,699, filed May 4, 2007, which claims the benefit of U.S. Provisional Application No. 60/746,388, filed May 4, 2006, and also a continuation-in-part of U.S. application Ser. No. 11/401,095, filed Apr. 10, 2006, now abandoned which claims the benefit of U.S. Provisional Application No. 60/669,793, filed Apr. 8, 2005.

FIELD OF THE INVENTION

The present invention relates to methods and systems for managing the risk arising from intellectual property. More specifically, the present invention is directed to a system and methods for managing the risk of liabilities arising from alleged misappropriation or misuse of intellectual property owned by another or others.

BACKGROUND OF THE INVENTION

Intellectual property may be subject matter protected by copyright, patent, trademark, trade secret or right of publicity law. In the current marketplace, any business that develops a new product or service is at risk that the misappropriation or misuse of another or others intellectual property—either inadvertent or intentional—exposes the risk of infringement assertions of third-party patents when launching a new product or service. Such intellectual property may be owned by competitors, individual inventors, or patent licensing and enforcement companies ("PLECs"). Historically, the risk of intellectual property infringement claims could often be managed through cross-licensing and credible threats of countersuits. Today, however, because of the increased threat of infringement assertions by individual inventors and PLECs, cross-licensing and threat of countersuit are often insufficient for protecting a business from such assertions. Further, the risk of "royalty stacking", wherein a business is forced to pay royalties to multiple patent holders, adds to the overall costs and risks of releasing such a product or service. Additionally, judges and juries have had a difficult time reaching a reasonable assessment of the economic benefit of infringed patents resulting in oftentimes unexpected and excessively large patent infringement damages awards. To the extent they are available, risk management products—such as those made by insurance companies—can be expensive and may offer insufficient coverage limits. Further, insurers have historically experienced difficulty in efficiently pricing such products, resulting in unacceptably high premiums or loss on the underwriting of policies.

Generally, a captive insurance company—also referred to herein simply a captive—is an insurance company that only insures all or part of the risks of its parent. In other words, it is an enterprise with all the authority to perform as an insurance company, but is organized by a parent company for the express purpose of providing the parent company's insurance. A captive or captive insurer is a risk management structure by which a business forms its own insurance company subsidiary to finance any losses.

Generally, captives are formed for various reasons. One reason is lower insurance costs. Commercial market insurance premiums must be adequate to meet the cost of claims, but consistent with other commercial enterprises. Insurers typically include in the premium an element to provide for their acquisition costs, overheads and profit. This portion of the premium can represent as much as 35% or 40% of the whole. In establishing a captive, the parent seeks to retain the profit within the group, rather than see it go to an outside party. A captive may also help reduce insurance costs by charging a premium that more accurately reflects the parent's actual loss experience.

Another reason to form a captive relates to cash flow. Apart from pure underwriting profit, insurers rely heavily on investment income. Premiums are typically paid in advance while claims are paid out over a longer period. Until claims become payable, the premium is available for investment. By utilizing a captive, premiums and investment income are retained within the group, and where the captive is domiciled offshore, that investment income may be untaxed. Additionally, the captive may be able to offer a more flexible premium payment plan thereby offering a direct cash flow advantage to the parent.

Risk retention is another reason captives are formed. A company's willingness to retain more of its own risk, particularly by increasing deductible levels, may be frustrated by the inadequate discount offered by insurers to take account of the increased deductible and by the fact that the company is unable to establish reserves to pay future claims. Establishment of a captive can help address both these problems.

Captives also address the unavailability of coverage. Where the commercial market is unable or unwilling to provide coverage for certain risks or where the price quoted is seen to be unreasonable, a captive may provide the coverage required.

A captive can also act as a focus for the risk management and risk financing activities of the parent organization. An effective risk management program may result in recognizable profits for the captive. Risk management can be viewed by a captive not as a cost centre, but as a potentially profitable part of the company's activities. A captive can also be used by a multinational company to set global deductible levels and enabling a local manager to insure with the captive at a level suitable to the size of their own business unit while the captive only buys reinsurance in excess of the level appropriate to the group as a whole.

Captives also enable access to the reinsurance market. Reinsurers are the international wholesalers of the insurance world. Operating on a lower cost structure than direct insurers, they are able to provide coverage at advantageous rates. By using a captive to access the reinsurance market the buyer can more easily determine their own retention levels and structure their program with greater flexibility.

Another reason captives may be formed is to write unrelated risks for profit. Apart from writing its parent's risks, a captive may operate as a separate profit centre by writing the risks of third parties. In particular, an organization may wish to sell insurance to existing customers of its core business. For example, retailers may sell an extended warranty to cover the risk being carried by the retailer's captive. The claims pattern of this type of business is usually very predictable with a large number of small exposures and provides the retailer with a valuable additional source of revenue.

Yet one more reason captives may be formed is tax minimization and deferral. Tax considerations in forming a captive depend on the domicile of both the parent and the captive. Integration of a captive as part of an overall tax planning strategy is a complex subject so that professional legal and tax advice may be helpful.

Currently, there are many types of captive insurers. Single-parent captives underwrite only the risks of related group companies. Diversified captives underwrite unrelated risks in addition to group business. Association captives underwrite the risks of members of an industry or trade association, such as liability risks of medical malpractice.

Agency captives are formed by insurance brokers or agents, which allow them to participate in the high-quality risks that they control.

Rent-a-captives are insurance companies that provide access to captive facilities without the user needing to capitalize their own captive. The user pays a fee for the use of the captive facilities and is usually required to provide some form of collateral so that the rent-a-captive is not at risk from any underwriting losses suffered by the user.

Another type of captive is Special Purpose Vehicles ("SPVs"). SPVs are used in risk securitization. They are reinsurance companies that issue reinsurance contracts to their parent and cede the risk to the capital markets by way of a bond issue.

Risk-Retention Groups ("RRGs") are another type of captive, which are usually liability insurance companies owned by their members. Under the Liability Risk Retention Act ("LRRA"), RRGs must be domiciled in a state. Once licensed by its state of domicile, an RRG can insure members in all states. Because the LRRA is a federal law, it preempts state regulation, making it much easier for RRGs to operate nationally. As insurance companies, RRGs retain risk. These are excellent vehicles for medical malpractice insurance.

Captives may be established as direct-writing companies issuing policies to, and receiving premiums from, their insureds, but the insurance industry is generally highly regulated, and in many jurisdictions, certain risks may only be written by an admitted insurer. Usually, and particularly in the case of smaller captives, it is simpler for the captive to operate as a reinsurer accepting the risks of its parent, which have been insured by a licensed direct-writing company (a "fronting company") and then ceded to the captive. The fronting company usually charges a fee for its services and may require a letter of credit to guarantee the captive's ability to pay claims.

In addition to some of the types of captives described above, captives can fall under different tax and regulatory regimes. Captives can be taxed as a U.S. company, or may choose to be taxed as a foreign company. Captives can be formed in several states in the U.S., or can choose from one of several competent offshore jurisdictions.

A demand therefore exists for a system and methods for, and through the use of, which the risk arising from the intellectual property rights owned by another or others can be better assessed and managed. The present invention satisfies the demand.

SUMMARY OF THE INVENTION

The present invention is a system and methods for any by which risk, for example, an entity's commercialization activities constitutes an unauthorized use of another or others intellectual property rights and the liabilities arising therefrom can be better assessed and managed. The system and methods of the present invention is intended to allow an entity to minimize or transfer its exposure to intellectual property infringement litigation liabilities by conducting pre-emptive analyses and properly allocating funds for potential royalty payments, settlement costs, infringement damages and/or litigation costs. Also presented herein are insurance systems to facilitate the managing and transferring of the risk of liabilities arising from intellectual property litigation. One specific embodiment of the present invention is directed to system and methods of managing and transferring the risk of liabilities arising from patent infringement litigation.

One embodiment of a method of managing exposure to intellectual property damages liability arising out of a patent, includes performing a patent search to identify an infringement relevancy group. The infringement relevancy group may include at least one patent having at least one claim reading on a product. A willing fair royalty is calculated for at least one patent in the infringement relevancy group. This calculated willing fair royalty is offered to at least one owner of the patent owner group. For purposes of this application the term "owner" or "IP owner" used herein may refer to one or more individuals, entities, companies, agencies, or any combination thereof.

Then, an insurance policy includes a premium for the insurance policy that is based in part on how many owners from the patent owner group accept the offered willing fair royalty. The insurance policy may provide that an insurer will indemnify an entity for damages liability owed to an owner from the patent owner group, and/or indemnify an entity for damages liability owed to an owner of a patent, such as when the patent is not in the infringement relevancy group. In addition, a total fair royalty for the product based on the infringement relevancy group may be calculated. The step of calculating a total fair royalty may include estimating an amount of profit from sales of the product. For purposes of this application, the term "product" includes services unless otherwise stated. The step of calculating a total fair royalty may include estimating an amount of revenue from sales of the product and may further comprise the steps of analyzing whether at least one patent in the infringement relevancy group is valid and obtaining a validity opinion on at least one patent in the infringement relevancy group. The infringement relevancy group may be shielded from an entity if the entity may be subject to damages liability to an owner of a patent in the infringement relevancy group.

Also disclosed herein is a system and method by which an entity can manage exposure to damages liability. An economic analysis is performed to calculate a total maximum royalty for a product, wherein the total maximum royalty is based on an estimated cost and an estimated sale price of the product. In underwriting an insurance policy, a premium of the insurance policy may be based, in part, on the calculated total maximum royalty. The insurance policy could include a provision providing that at least a portion of any unused premium is returned to the manufacturer upon termination of the insurance policy. The method may further calculate a Fair Maximum Potential Liability ("FMPL"), wherein the FMPL is based on the total maximum royalty and the amount of royalty attributable to the entity's own intellectual property. The premium of the insurance policy may be based in part on the FMPL. The insurance policy is offered to the entity. The entity may be indemnified if the entity is liable for damages to a third-party by delivering at least a portion of the premium to the third-party. At least a portion of the premium is returned to the entity.

Further disclosed herein is a system comprising a computer-readable storage medium that stores instructions executable by at least one processing device. The storage medium generally includes, instructions for obtaining a search query, the search query identifying a infringement relevancy group, including an infringement relevancy group with at least one patent having at least one claim reading on a product. The storage medium further includes instructions for determining a total fair royalty and allocating the total fair royalty to determine a willing fair royalty for at least one patent in the infringement relevancy group. The system further comprises a user interface adapted, for example, to control the system to determine the status and results from the calculation analysis, and/or to display an output from the processing device after the processing device has executed, at least in part, at least one of the instructions. The output displayed on the user interface may be the determined willing fair royalty. The user interface may be a webpage, for example. Among other advantages, certain preferred embodiments of the system provide an information source by which or through the use of a patent owner may determine, for example, if a product manufacturer is seeking to obtain a license to make, use, sell and/or distribute a product that may be covered by a patent owned by the patent owner.

In varying embodiments of the invention, execution of the Intellectual Property Umbrella Captive ("IPUC"), or simply referred to as "captive" or "captive insurance company" herein, includes an initial assessment of the intellectual property Value-at-Risk (Phase I); creation and funding of the required structure (Phase II); and implementation of the necessary process and control elements to manage the identified risks (Phase III). Coincident with formation, patent Sale/License Back ("S/LB") options as well as reinsurance or umbrella insurance policies preferably exist to enhance or accelerate execution. An IPUC enhances financial reporting transparency through valuation, risk identification, risk quantification and claim tracking. An IPUC may concentrate on management of IP risk and acts as a central repository of IP risk data. Where appropriate, an IPUC may diversify and pool IP risk and/or aggregate IP assets to strengthen offensive or defensive positions as well as increase opportunity to strategically transfer risk through reinsurance. It is also contemplated that an IPUC could establish a SEC-compliant reserve for catastrophic losses and obtain tax and time-value benefits associated with well designed captive structures.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left most digit of a reference number identifies the drawing in which the reference number first appears.

DETAILED DESCRIPTION OF THE INVENTION

The following is discussed in reference to a patent, but all forms of intellectual property are contemplated such as copyright, trademark, trade secret and right of publicity.

Figure 1:
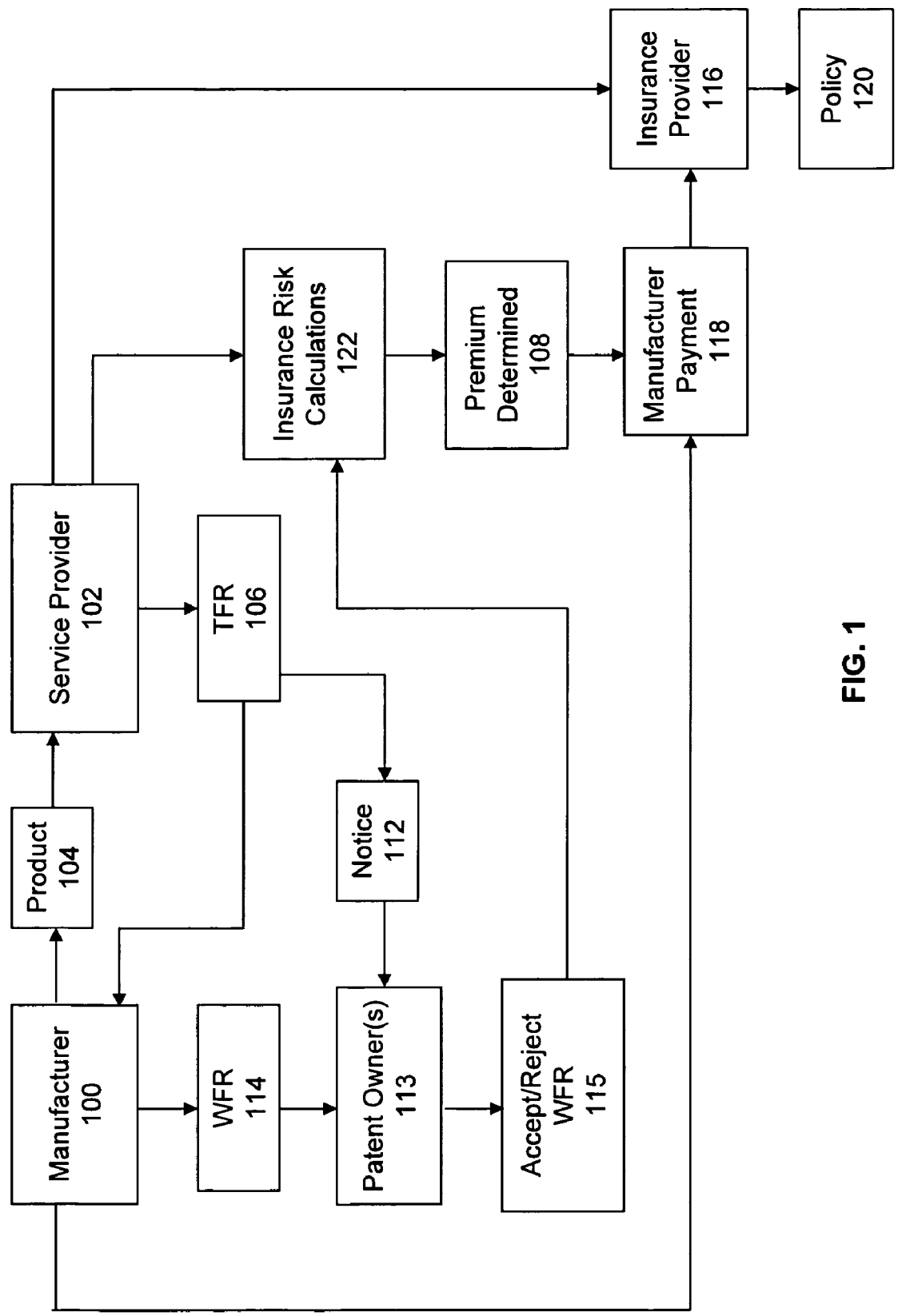
FIG. 1 is a schematic, high-level diagram of one embodiment of the present invention.

FIG. 1 shows a schematic, high-level diagram of one embodiment of the present invention. As shown in FIG. 1, an entity, in this example, a manufacturer 100, presents a new product 104 to a service provider 102. The term "product" is not meant to be limited to a tangible item. For instance, a product may also include a service. In such a case, the "manufacturer" of the service is the person or entity which develops and/or offers the service to customers. Therefore, as used herein, the term "product" is meant to broadly include any article of manufacture, machine, composition, system, computer program product, software, hardware, signal, process, methods of making or using an apparatus, business methods, or services and "manufacturer" is also meant to include the creator or developer of a product or service, as well as any separate person or entity that prepares and/or offers a commercial version for license or sale.

According to the embodiment of the present invention shown in FIG. 1, manufacturer 100 can communicate with and engage service provider 102 to manage and/or transfer the risk related to the assertion that one or more patent claims cover (i.e., read on) new product 104. As used herein, claims "covering" the product broadly means that the claims could reasonably be believed to be infringed by product 104 as a whole, or by some aspect embodied in product 104. In FIG. 1, the new product 104 may be an actual article of manufacture provided to the service provider 102 for examination or simply a flow of information providing the details of the product 104. For example, where product 104 is an article of manufacture, patent claims may "cover" or "read on" the article when the article or one or more particular components of the article could reasonably be asserted to infringe the claims. Other patent claims may cover a method of manufacture of the article when the manufacturer employs a process during the manufacture of the item that could reasonably be asserted to infringe the claims. Further, patent claims may be considered to cover the article simply because manufacturer 100 uses an intermediate product in the manufacture of the article that could reasonably be asserted to infringe the claims. Hence, it is possible that one or a plurality of patents may be considered to cover, or read on new product 104.

In one embodiment of the present invention, service provider 102 determines a Total Fair Royalty (TFR) 106 for the product 104. An TFR 106 is an estimation of the percentage of the revenue (or other measurable metric) generated from the sale or licensing of a product 104 that should be set aside for royalty payments adequate to fairly compensate patent owners for the use of patents covering the product. In determining TFR 106, service provider 102 may take into account considerations such as how many patents cover the new product, other intellectual property embodied in new product 104, the relative importance of the patents that cover the new product 104, established royalties for comparable patents or products, the expected profitability of new product 104, and the expected revenue that can be generated from the sale or licensing of new product 104. According to various embodiments, TFR 106 can also be determined using economic tools. For example, TFR 106 can be based on the fair maximum potential liability, described herein with reference to FIG. 4.

In certain embodiments, after making a determination of TFR 106, service provider 102 may provide notice 112 to patent owner(s) 113 who have the right to assert patent(s) covering new product 104. Notice 112 may be provided in a variety of ways, and according to various embodiments, can be given either publicly or privately. For example, service provider 102 may contact patent owner(s) 113 by certified mail, or by making a public announcement via the internet or a publication such as the WALL STREET JOURNAL® newspaper or other newspaper, magazine, or other periodical. Public notice 112 is intended to notify patent owner(s) 113 of manufacturer's 100 willingness to pay a Willing Fair Royalty (WFR) 114 for a license to exercise intellectual property or other rights needed in order to develop or commercialize new product 104. WFR 114 will typically be different from TFR 106. TFR 106 is the total amount allocated for royalty payments to all patent owners 113 having patents covering the new product 104. WFR 114, on the other hand, is an amount (typically a percentage of TFR 106) offered to a particular patent owner in exchange for a license. In the context of rights granted to manufacturer 100, a license can be embodied as a non-assertion agreement, a covenant not to sue, and other legally binding instruments which will be apparent to one of skill in the art. Methods for determining WFR 114 are described herein with reference to FIG. 2.

If all known relevant patent owner(s) 113 accept the offer for WFR 115 in exchange for a license, then manufacturer 100 can more comfortably proceed with launching new product 104. If, on the other hand, not all known relevant patent owner(s) 113 accept the terms of the offer for WFR 115, then the WFR 114 is paid to those patent owner(s) 113 that accept the offer, and the manufacturer 100 may pay all or some of the unaccepted WFR 114 (in some cases the balance of TFR 106) to an account established within the service provider 102 or a separate escrow account as portion or the entire payment of an insurance premium payment 118 against future patent infringement claims. (Insurance premium payment 118 will typically comprise some amount paid that is "pure" premium to protect against additional risks such as those from unaccepted licensing offers, unidentified patents and excessive awards. Insurance premium payment 118 may also include some amount which is paid to service provider 102 as a service fee.)

In return for insurance premium payment 118, and in accordance with insurance risk calculations 122, manufacturer 100 may obtain an insurance policy 120 from or through service provider 102 or through a separate provider 116 such as a service, agent, or company to cover all, or part of, any settlements reached or actual damage awards arising out of a dispute or granted in later patent infringement suits. In other embodiments, the insurance policy can also cover other expenses or liabilities related to patent infringement litigations (either actual or threatened), for example, attorney's fees or court costs.

The insurance premium is determined 108 in performing insurance risk calculations 122. Service provider 102 or another provider 102 can consider the economic risks related to potential liability exposure from patent litigation and such factors as: (i) the likelihood that the identified patents would withstand an invalidity challenge; (ii) the likelihood that new product 104 would actually be found to infringe the identified patents; and (iii) the amount of damage that potentially may be awarded to patent owner(s) 113. Additional known insurance risk analysis techniques may be employed in insurance risk calculations 122.

If a sufficient number of patent owner(s) 113 accept the WFR 114, then a market-tested methodology for determining royalty for third-party patents that may cover new product 104 has been established. Such information may later be used in litigation involving any non-accepting patent owner(s) 113 (or any other patent owners not originally identified by service provider 102). If a court ultimately awards damages to any non-accepting patent owner(s) 113, such damages could possibly be limited to a royalty calculated using the same methodology used to calculate WFR. If such damage awards exceed the fair royalty using this established methodology, then the damages (or a portion thereof) may be paid by the insurer which in certain embodiments is the service provider 102, and not by manufacturer 100 (except to the extent that "co-payments" are required, exclusions apply, or the settlement reached or damages awarded exceed the insurance limits set by the provider 102), which, as mentioned above, may also be the insurer.

In an alternative embodiment, a separate entity that is an insurer may assume some or all of the risk rather than the service provider 102.

As a result of this indemnification, manufacturer 100 has transferred a portion of the economic risks associated with potential patent infringement litigation. Manufacturer 100 may also effectively plan based on a reasonable estimation of the total costs associated with releasing a new product 104, recognize costs associated with revenues in the appropriate period and smooth reported earnings. In the event that a dispute does not arise based on patents owned by another or others which causes a settlement to be reached in which payments must be made to the patent owners, or that manufacturer 100 is not actually sued for infringement, then the party that accepted the responsibility to pay any settlement amounts or damages award based on receipt of an insurance premium (such as the service provider 102 or, in some embodiments, the insurer) may keep the balance of insurance premium payments 118, or may alternatively return some portion of the insurance premium payments 118.

As described, service provider 102 determines a TFR 106, provides notice 112 to patent owner(s) 113, engages a party or actually conducts insurance risk calculations 122, and provides manufacturer 100 with an insurance policy 120 in return for insurance premium payments 118.

In alternative embodiments, service provider 102 may perform only one of, or any combination of, the listed services. For example, service provider 102 may simply serve as an intermediary between an insurance company and manufacturer 100, provide the service determining TFR 106, and/or provide notice 112. Alternatively, service provider 102 may hire outside consultants, such as law firms or consulting firms, to determine TFR 106. Further, in some embodiments, manufacturer 100 may itself provide notice 112 to patent owner(s) 113. In such alternative embodiments, service provider 102 effectively acts as a manager of the individual steps and associated transactions.

Figure 2:
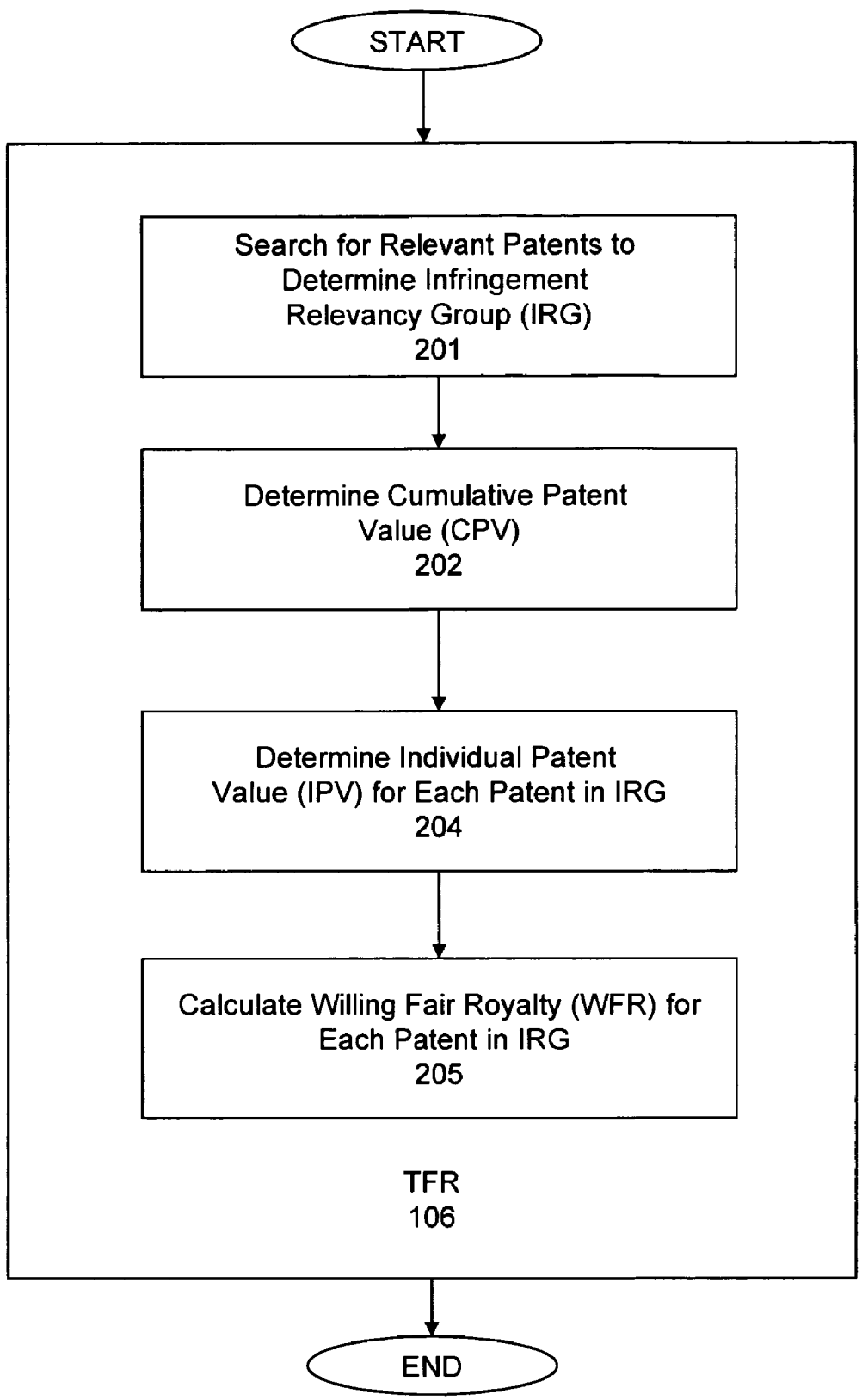
FIG. 2 is a flowchart showing an exemplary method by which a Willing Fair Royalty may be determined.

FIG. 2 is a flowchart showing an exemplary method of determining WFR 114. It should be noted that the steps shown in FIG. 2 are shown for exemplary purposes only. Additional or alternative calculations and analysis may be performed without departing from the scope of the present method. Further, WFR 114 may be determined by any entity, such as service provider 102 alone, service provider 102 in conjunction with a third-party consultant or law firm, or a third-party consultant or law firm alone.

With respect to the preferred embodiment shown in FIG. 2, in step 201, a patent search is conducted to identify an Infringement Relevancy Group (also "IRG" herein). The IRG is a set of one or more patents that cover the new product 104. Known search and infringement analysis techniques can be used to identify the IRG. In some embodiments, the owners of the patents in the IRG are also identified.

The IRG may be revealed to manufacturer 100, or may be shielded from manufacturer 100. Shielding the IRG from manufacturer 100 may protect manufacturer 100 from later claims of willful infringement (and hence may reduce the risk of enhanced or treble damages under 35 U.S.C. §284).

In step 202, a Cumulative Patent Value (CPV) is determined. The CPV is a quantified expression of the value and/or strength of the patents in the IRG, and may be expressed in monetary units or other units of measure. The CPV may be determined based on various known patent valuation techniques and calculations. For example, the CPV can based on such factors for each patent as: (i) the likelihood that the patent will withstand an invalidity challenge; (ii) the likelihood that the new product will be found to infringe the patent; (iii) the cost of redesigning the product to avoid infringement; and (iv) the potential damage awards stemming from an infringement suit. In another embodiment, CPV can be determined using objective analytic tools. For example, Ocean Tomo Patent Ratings, LLC, of Newport Beach, Calif., produces an Ocean Tomo Patent Maintenance Value (OTMV), which is an assessed patent value based on characteristics, metrics, and claim breadth of a patent. Ocean Tomo Patent Ratings, LLC, also has an alternative metric known as Intellectual Property Quotient (IPQ™). IPQ is a score gauging and comparing patent quality/value based on the cumulative characteristics of the patents and the statistical likelihood that a patent will produce economic returns. CPV can be based on OTMV, IPQ, other metrics—available from a variety of alternate providers, or other alternative analytical methodologies. Methods and systems for rating/valuing intangible assets, such as patents, are described in U.S. Pat. No. 6,556,992; U.S. Pat. No. 7,228,288; U.S. Pat. No. 7,216,100; U.S. Pat. No. 7,269,566; U.S. Pat. No. 7,353,202; U.S. Patent Application Publication No. 2004/0010393, and U.S. Patent Application Publication No. 2004/0220842, the entire disclosures of which are hereby incorporated by reference in their entirety.

In step 204, an individual patent value (IPV) is determined for each patent in the IRG. The IPV is generally expressed in the same unit of measure as the CPV. The IPV may be determined by various analysis techniques, one of which is simply allocating the total CPV equally among the patents in the IRG. In another embodiment, CPV is divided among the patents in the IRG based on the comparative value, relative importance and/or strength of each patent.

Steps 202 and 204 can be performed in either order according to various embodiments. In one embodiment, for example, IPV for each patent can be determined directly based on subjective or objective analysis of the patents in the IRG, and CPV can be determined by summing the determined IPVs.

In step 205, the WFR 114 for each patent (or patent owner) is determined. WFR 114 can be determined for a particular patent, for example, based on the relationship between the IPV for that patent and the CPV. Thus TFR 106 can be allocated among the owners of patents in the IRG based on the relative IPVs of their patents. Other techniques for determining TFR 106 and WFR 114 will be apparent to one of skill in the art without departing from the scope of the present invention.

Step 201 typically includes a search for potentially relevant patents and an assessment of whether the patents cover (as defined herein) product 104. Published patent applications and foreign patents may also be considered in the patent search of step 201, and as such can be included in the IRG. In some embodiments, published patent applications and foreign patents can also be included in the calculations of steps 202 and 204. According to some embodiments, step 201 can be repeated periodically to detect newly issued or published patents.

In one embodiment, TFR 106 is fixed for the life of the product 104 or some other fixed or conditional period of time, and the identification of a new covering patent or patent application simply results in a reallocation of royalty payments to individual patent owners. In some embodiments, the TFR 106 may change as new covering patents issue, publish, or are identified. In one embodiment, increases to the TFR 106 are offset at least in part by payments from the service provider or the insurer.

Current United States case law in patent matters has focused the determination of a royalty rate for damage awards on either an established royalty or a reasonable royalty based on hypothetical negotiations. Ongoing evolution in relevant case law and proposed legislation reinforce that this fair royalty should reflect a patent's specific contribution of economic value of the product over the prior art and other features and improvement, whether or not patentable, of the product. Accordingly, determining TFR 106 and WFR 114, and ensuing steps, may preferably create a recognized methodology to calculate a market-established royalty. Further, the consideration of CPV and IPV(s) relative to TFR provides a recognized methodology for the allocation of the economic benefit to the specific patent. Increased acceptance of the presented method will further strengthen manufacturer's 100 position that WFR 114 is able to calculate a market established royalty. Further, as will be appreciated by those skilled in the relevant art(s) after reading the description herein, in one embodiment, determination of TFR 106 and/or WFR 114 may be periodically repeated (e.g., annually) to identify newly-issued patents, newly-published applications, reissued patents, republished applications, and/or reexamined patents that should be added or deleted to the IRG thereby affecting the ratios of IPVs to CPV and related calculations.

Figure 3:
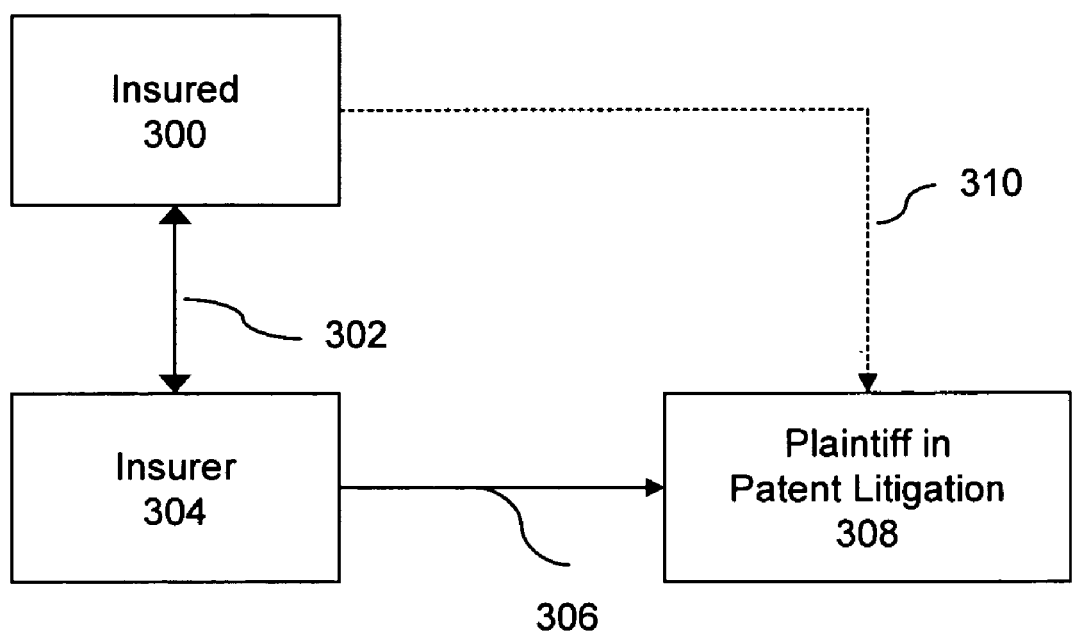
FIG. 3 is a schematic, high-level diagram of an alternative embodiment of the present invention.

FIG. 3 is a schematic, high-level diagram of an alternative embodiment of the present invention. As shown in FIG. 3, the insured party 300 has a contractual obligation 302 with an insurer 304. The insured party 300 may be a manufacturer as described above. The insurer 304 may be a service provider or insurance company as described above. The contractual obligation 302 is generally an insurance policy. Contractual obligation 302 provides that the insured 300 pays premiums and fees to the insurer 304. In return, the insurer 304 provides a coverage policy to the insured 300. The coverage policy may provide that, if a plaintiff in a patent infringement suit 308 is awarded damages for which the insured 300 is liable, insurer 304 will pay damages 306 to plaintiff 308. If the damages awarded to plaintiff 308 are in excess of the coverage policy, then the insured 300 may pay such excess, as diagramed by arrow 310. In some embodiments, the insurance policy would also cover other expenses or liabilities resulting from patent infringement litigations; for example, settlement payments, attorney's fees or court costs.

Figure 4:
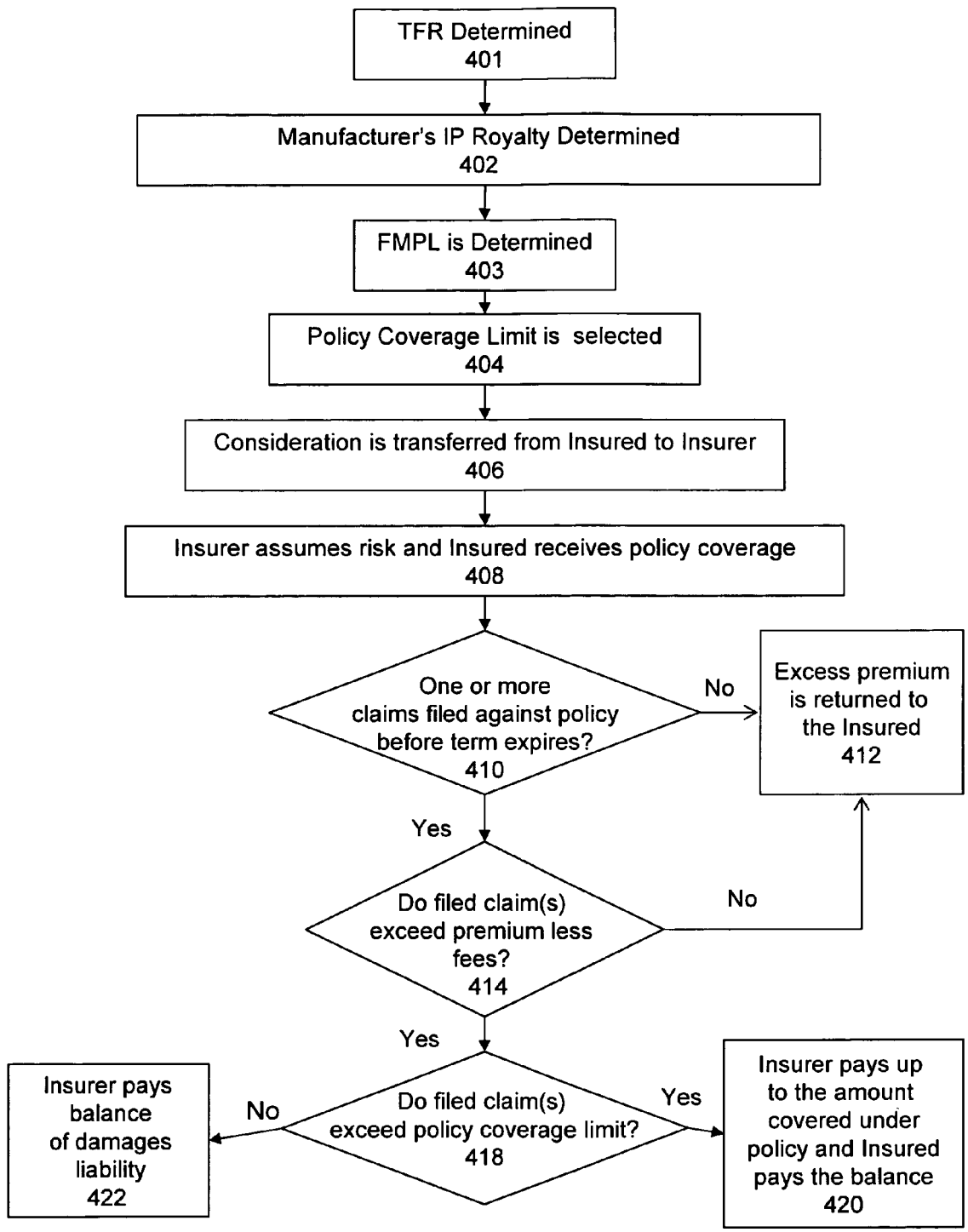
FIG. 4 is a flowchart showing an exemplary method in accordance with an alternative embodiment of the present invention.

FIG. 4 is a flowchart showing an exemplary method in accordance with an alternative embodiment of the present invention, and in accordance with the relationships diagramed in FIG. 3. As shown in FIG. 4, after TFR is determined at step 401 and the manufacturer's IP royalty is determined at step 402, a fair maximum potential liability (herein "FMPL") is determined for a particular product at step 403. To determine FMPL, first a total maximum royalty is determined based on the assumption that all technology embodied in the product would need to be in-licensed by the manufacturer from a third party. The total maximum royalty does not necessarily take into account the value, validity, and/or enforceability of any actual patents. Rather, FMPL is based principally on an economic analysis of the product and/or features of the product. Total maximum royalty is an estimation of the aggregate royalties which a manufacturer would be able to pay and still make sufficient profit to justify producing the product. To determine FMPL, the amount of royalty attributable to the manufacturer's own intellectual property is subtracted from the total maximum royalty. The manufacturer's own intellectual property can include patents and other intellectual property owned by and/or licensed by the manufacture and/or any other technology accessible to which the manufacturer is known to have the rights to freely practice. To facilitate calculation of the FMPL, the insured may provide information related to historical (if applicable) and projected revenues and profit of the covered product(s). The insured may also provide a summary of licensing information (including licensors, licensees and license terms), technical information (including descriptions of patents and other proprietary technology embodied in the covered products), and market information.

Calculation of the FMPL may be performed utilizing an analytical framework commonly used to establish patent infringement damages under a "reasonable royalty" theory of damages. An analysis is performed to assess a fair and reasonable royalty rate for a single hypothetical license that would grant rights to all technologies embodied in the covered product. This royalty rate would then be adjusted to account for the insured's internally developed or in-licensed technology. The resulting rate would then be used to calculate the FMPL, which could be expressed nominally based on the expected performance of the covered product(s), as a percentage of the covered product's revenue, or as a nominal amount per covered product unit sold.

Alternatively, the calculation of the FMPL may be performed utilizing an analytical framework commonly used to establish patent infringement damages under any patent damages theory; such as for example "lost profits". For instance, an analysis may be performed to determine how the production and sale of the product will affect the profits of a competitor. The analysis would then asses what damages may potentially be awarded to a competitor under a theory of "lost profits".

The insured selects a policy coverage limit in step 404. The policy coverage limit can be specified either as a nominal amount or a proportion of the calculated FMPL. The insured may select a policy coverage limit equal to, less than, or greater than the determined FMPL. The insurer may select a policy coverage limit based on the amount of potential future liabilities desired to be protected against at the time of purchasing the insurance policy.

In step 406, the manufacturer provides consideration (i.e. a "premium") to the insurance company in exchange for the insurance policy. The amount and form of the premium can depend on a variety of factors. In one embodiment, the premium is equal to the policy coverage limit. Some portion of the premium can be assessed as fees due to the insurer. The insurer's fees can be calculated based on the amount of risk being transferred from the insured to the insurer. For example, the fees may be reflective of the risk that the FMPL is accurately calculated. The insurer's fees may be reflective of the policy coverage relative to the portion on the FMPL the insured is willing to pay as premium for the policy. An insured opting to pay premiums equal to FMPL could reasonably expect its potential future liabilities to be fully funded. Should the insured opt to pay premiums less than FMPL, the potential future liabilities would not be fully funded. The insurer may thus assess the appropriate fees based on the amount of policy coverage desired by the insured. This underwriting process may take into consideration data reflective of the insured's historical liabilities which would be covered under the policy, the historical experiences of other companies or industries in general, or such catastrophic event modeling as is known in the art. The likelihood that a patent will be found valid and infringed, either in general or specific to the relevant industry or company, may also be considered in calculating the appropriate fees. Additional fees (for example, administrative or underwriting fees) may also be charged against the premium paid by the insured.

In consideration of the premium received, the insurer, as shown in step 408, assumes the risk that the insured's future damages, up to the policy coverage limit, may exceed the premiums paid.

Referring to step 410, it is determined if any claims have been filed against the policy before the term of the policy expires. The policy generally terminates at the end of the liability exposure period for the covered product(s). For example, the insurance policy can be scheduled to expire at the end of the statutory period of liability (currently, six years from the date of last infringement) of the covered product(s). Alternatively, the insurance policy may be scheduled to expire at a given date after release of the product (i.e. six years from product launch) or upon the occurrence of a given event In some cases, the insurance policy may be set up such that the insured may cancel the policy at any time.

If no claims have been filed against the policy before expiration, then some portion of the excess premiums are returned to the insured in step 412. The excess premiums are the premiums paid by the insured less all fees due to the insurer. The fees may be managerial fees and/or fees collected to compensate the insurer for taking on the risk that covered liabilities will exceed the premiums received. The fees may be dependent upon the technical field of the product covered.

If claims are filed against the policy before the policy expires, it is determined whether the total claims filed against the policy are in excess of the premiums paid by the insured less fees, as shown in step 414. If the claim(s) do not exceed the premiums paid less fees, some portion of the excess premiums are returned to the insured as shown in step 412. In this scenario, the excess premiums are the premiums paid by the insured less all claims (covered liabilities) against the policy and less all fees due to the insurer. If the claim(s) against the policy exceed the premiums paid less fees, then no premium is returned to the insured.

In step 418, it is determined whether claims (covered liabilities) against the policy exceed the policy coverage limit. If the claims exceed the policy coverage limit, the insurer pays up to the policy coverage limit, and the insured pays the remaining balance of the total liabilities, as shown in step 420. If the claims do not exceed the coverage policy coverage limit, the insurer pays the covered liabilities, as shown in step 422.

The insurance system described in FIG. 4 advantageously allows for manufacturers to cost-effectively transfer risk related to patent infringement litigation, as well as effectively manage their potential future liabilities related to patent infringement litigation. The system aims to smooth earnings volatility resulting from ineffectively managing the future potential liabilities related to patent infringement litigation. The system also may reduce the likelihood of an excessive damages award. For the insurer, the system can be used to effectively assess adequate compensation for the assumption of such risk.

While it is possible for an insured to obtain a single policy to cover all of its products, it is likely that an insured will desire separate policies for different products or product lines.

Figure 5:
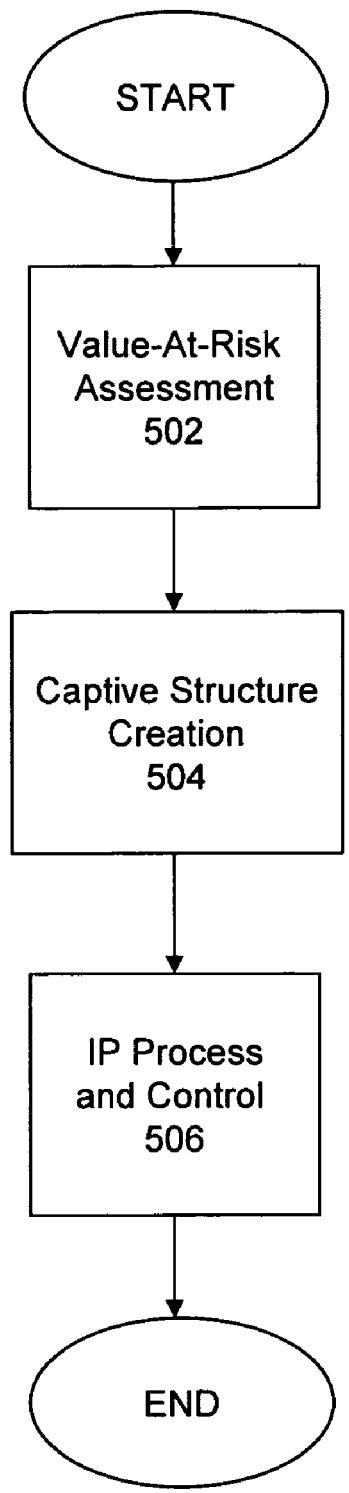
FIG. 5 shows a flowchart showing the implementation of an intellectual property umbrella captive.

FIG. 5 shows a flowchart directed to forming an intellectual property umbrella captive ("IPUC"). In the first phase (Phase I), an IP Value-at-Risk Assessment 502 is performed. In one embodiment, Value-at-Risk Assessments 502 are performed through a comprehensive review of properties, protocols and processes relevant to developing effective risk management.

The comprehensive review may include the collection and evaluation of primary information including an inventory of IP assets and related policies and procedures. The process may include assessing an owner's strategic objectives for its IP portfolio, reviewing the owner's policies concerning patentability and IP protection, and compiling a detailed summary of the owner's IP assets. For purposes of this application, the term "owner" may refer to the IP Owner, Compiling a detailed summary of the owner's IP assets may include, for example, issued and pending patent lists, process and control documents for patentability reports and IP committees, lists of current and past prolific inventors which might affect the owner's core business and related agreements, compilation of significant non-traditional IP including contract research.

The comprehensive review may also include review of owner's licenses, cross licenses, nondisclosure and non-compete agreements, joint ventures, and any partnerships related to IP exchange including revenues and costs related to these relationships. In addition, patent-based maintenance value calculations may be performed. Primary threats to IP portfolio may be identified including third-party risks such as competitive versus "submarine" patents, first-party risks such as invalidity or valuation risk (i.e., risk that patent value will be lower than reported valuations), directors' and officers' ("D&O") risks, errors and omissions ("E&O") risks, and enforcement costs and risks.

The comprehensive review may also include analysis of reserves and reserving protocols for open claims, utilization of current insurance assets, owner's management of IP counter-party risks (e.g., licensing, co-ventures), overview of the owner's IP D&O and E&O strategies including, for example, information flow to the Board of Directors and Officers on IP issues and IP disclosures and disclosure protocols.

A determination of potential infringement challenges (offensive and defensive) and model damage exposure and well as an assessment of a owner's exposure as a third-party indemnitor of patent infringement risks may also be part of the comprehensive review. In addition, the maximum adverse movement in IP portfolio within an accepted probability tolerance may be calculated, including maximum likely tax on liquidity ("IP VAR"), which would be determinative of limits, premium, and scope of coverage.

In the second phase (Phase II), the IPUC structure is created 504. In some embodiments, this phase includes work with captive and actuarial professionals in order to structure the IPUC consistent with all insurance industry requirements. Key elements of the IPUC creation often include a model premium based on IP VAR and loss adjustment expense projections. In addition, appropriate reserving policies for open and potential claims are determined as well as Incurred But Not Reported ("IBNR") losses, otherwise known as the "tail period", for major claims are ascertained.

In creating the IPUC structure 504, the extent of insurable (i.e., fortuitous) risks of loss are indentified and defined, including coordinating with existing insurance and indemnity coverage with attention to "other insurance" clauses. Subrogation clauses are drafted and related matter, for example, media, trademark and cyber-exposures is selected and integrated.

The optimal length of policy terms must be determined and manuscript policies to cover insurable risks should be generated. In certain embodiments, an outside audit may be performed to verify accounting treatment (i.e., deducibility of premium and accrual treatment of multi-year premium payments) or to develop appropriate financial presentations including treatment in 10Q and 10K Forms.

Captive structures may include a single-parent, cellular structure, rented captive, group captive, for example a group aggregates patents or a patent investment entity is established to improve defensive positions, or any other contemplated captive structure.

The IPUC includes an optimal financial structure, including premium financing. Premium financing may include, for example four options. A first option finances the premium with a patent Sale/License-Back ("S/LB") arrangement. A S/LB could use proceeds to tax efficiently or otherwise capitalize the captive. A second option transfers intellectual property to the captive and funds the captive with royalty payments—either fixed or floating. A third option investigates capital markets structures ("CAT" bonds) and a fourth option offers conventional premium financing.

Finally, the IPUC jurisdiction is selected. In selecting the captive jurisdiction, the trade-off of regulation versus credibility must be analyzed. In addition, the jurisdictional capitalization requirement and reporting requirements should be determined such that frictional costs are minimized. Ultimately, the IPUC structure is created that includes a well-designed captive premium investment strategy.

In the third phase (Phase III), the owner's best practices for managing IP risks is created and documented through IP process and control 506. The IP process and control improves coordination and information flows between legal, risk management and research and development ("R&D") departments within a company. In some embodiments, elements of the IPUC may include reviewing the owner's policy for patent risk assessment in the R&D decision making process including invalidity issues, infringement issues, patent workaround, "double patenting" and patent matrices. In addition, the owner's strategic approach to generic challenges may be evaluated as well as the coordination and information exchange among departments such as an internal Patent Law department, Chief Technology Officer department, treasury and Chief Financial Officer department, outside law firms and consultants.

IP process and control contemplates the development of protocols for integrating an IP Risk Management team with an Information Assets Manager ("IAM") function that includes the lines of reporting and authority as well as the Risk Management team's input into patenting decisions.

IP process and control also includes the development of IP related Sarbanes-Oxley protocols and control systems and the identification of opportunities to spin-off risk. Opportunities to spin off risk include contractual indemnities and third-party bonding, which includes identifying and classifying all contractual indemnities where owner is indemnitor or indemnitee, protocol development for tapping indemnity contracts including contractual compliance, and the leverage vendor relationships to obtain surety bonds for risks that can be efficiently relegated to vendors. In auditing and valuing indemnity contracts where the owner is the indemnitor, it must be decided whether or not to cover contracts in the IPUC. This decision may include the determination if any contracts such as "insured contracts" under other coverage are available.

Further alternative risk transfer mechanisms such as securitization models may be identified and implemented. Reviewing the owner's policy directed to managing opportunities for licensing in and out in a non-litigation environment is necessary in order to make IP policy and procedure recommendations for licensing in and out. In addition, the organizational structure for executing licenses should be established as well as the evaluation of the owner's potential use of Intellectual Property Holding Companies and other tax efficient strategies for IP transactions and ownership of IP assets. The competitive position in target markets can be identified and compared to the strength of the IP portfolio. Patent analytics allow the mapping of patent portfolio coverage in target markets and with strategic objectives to identify technology gaps. Decision tools can be developed to compare the cost-benefit of R&D versus licensing in order to fill the technology gaps that were identified. Decision tools may include the assessment of the likelihood of R&D success including timing and costs, review of one or more competitor's patent positions including blocking patents to focus R&D, and market potential evaluation and comparison to R&D and/or licensing cost.

Knowledge of one or more competitor's portfolios assist in assessing and managing benefits and risks of licenses or cross-licenses. In one embodiment, a methodology may be developed to compare licensing in with outright purchase of technology or an entire company.

Phase III, IP process and control 506, includes protocols or policies that direct decisions in what to patent and when, assessing the relative value of trade secret status versus patent status, and how to identify and capture valuable IP outside of core strategic IP such as business process method patents. IP process and control should also review or develop the owner's enforcement strategy, including litigation risk tolerance and cross-licensing strategies. In addition, IP review committees including addressing patent disclosures, assigning filing priorities, recommending incentives for employees and other related tasks should be formed.

Figure 6:
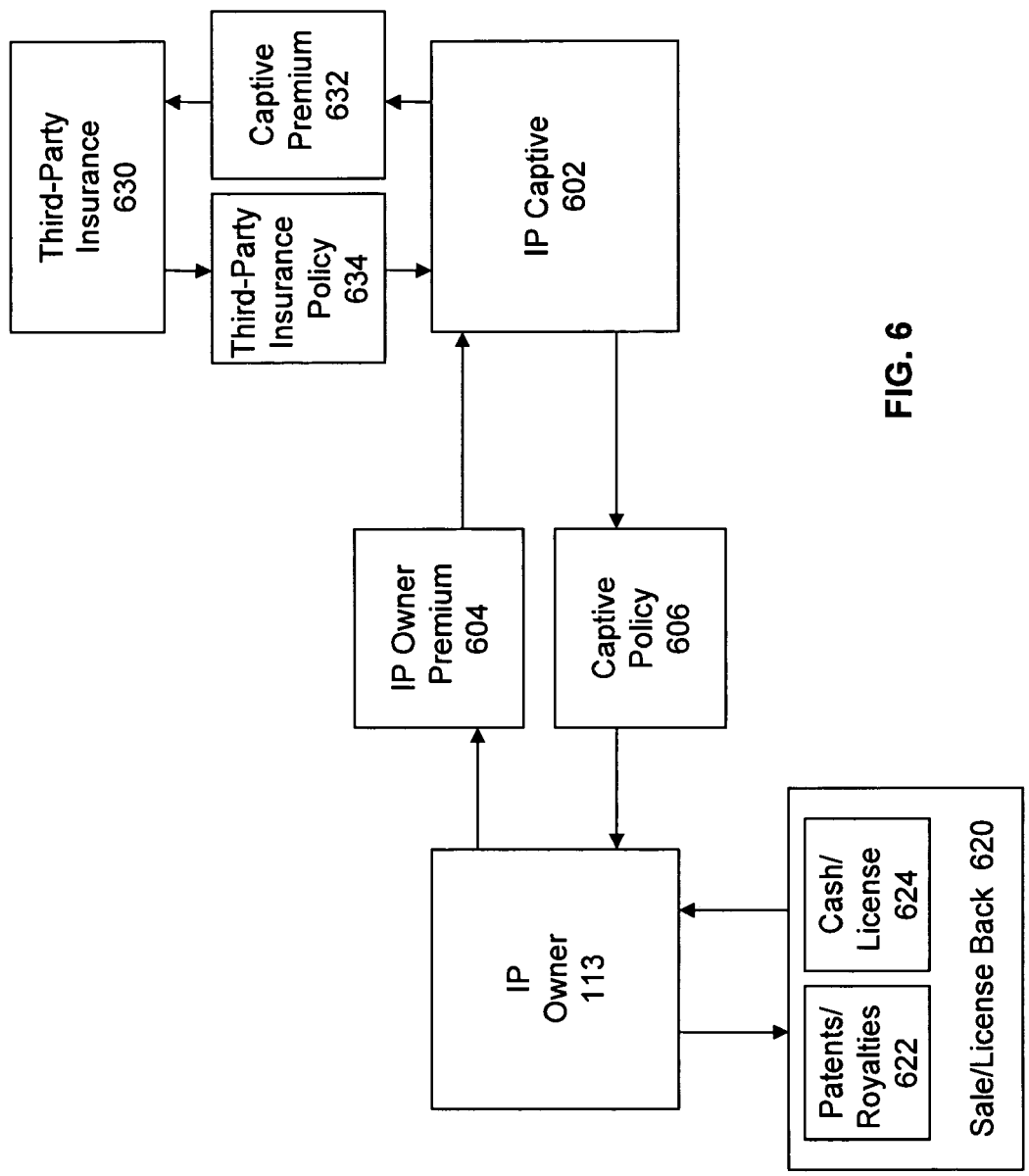
FIG. 6 shows a diagram of one embodiment of the relationships between parties and an IPUC.

FIG. 6 shows a diagram of one embodiment of the relationships between relevant parties and entities around an IPUC. Once the IP captive 602 is implemented such as by the embodiment described in reference to FIG. 5, the owner 113 pays the captive a premium 604 in exchange for a policy 606. Again, the policy 606 is based in part on insurance risk calculations, as described in reference to FIG. 1.

The embodiment described in reference to FIG. 6 includes a S/LB component 620. A third party can arrange for the owner to sell 622 and simultaneously license-back 624 a portion of its U.S. patent portfolio in order to fully fund the IPUC using an upfront premium. This may generate cash to pay for such premium and also for commercializing select technologies by third party commercialization. Preferably, the sale price of agreed upon patent assets are consistent with valuations determined by an independent appraiser. This S/LB structure 620 provides a compelling business opportunity for the owner over and above the creation of the IPUC consistent with its mission and annual plan for exploiting its intellectual property assets.

Simultaneous with the sale of the patent assets, the owner may, in some embodiments, receive a non-exclusive field-of-use back-license to allow for its continued use of the patented technology. The overall S/LB transaction 620 may be structured as a sale for tax purposes and as a financing for accounting purposes. Preferably, payments due by owner under the back-license are fully deductible for tax purposes, analogous to those made under similar real property leasing arrangements. Preferably, the license-back obligation will be equal in all important respects with the owner's senior unsecured debt obligations.

Although traditional IP based risk transfer insurance is not readily available, markets do exist to provide additional risk transfer to captive structures through reinsurance, layered captives or "umbrella" policies. As shown in FIG. 6, the captive 602 pays the third-party 630 a premium 632 in exchange for a policy 634. Investigation of these options may include, but is not limited to, the price and place of reinsurance such as limits (ideally 100-200% of captive retention), premium levels, policies following the form of primary or restricted policies, reporting requirements including claims and settlement controls, and any additional level of financial control and risk transfer to protect shareholder value.

Reinsurance of umbrella coverage diversifies risk with other captives such as by reinsurance layers, integrated risk swaps (correlated to other financial returns), the pursuit of asset/patent aggregation strategies inter-captive, and the use of S/LB funding across multiple portfolios, depending on availability and timing of capital loss carry-forwards, to enhance efficiency.

Examples are now presented below. The examples are presented for exemplary purposes only to further clarify implementation of selected embodiments of the invention. The presented examples should not be interpreted to limit the scope of the present invention in any manner.

In a first example, a service provider is hired by a manufacturer with respect to the manufacturer's product. The service provider searches for relevant patents and finds 25 third-party patents, owned by 25 different patent owners, which could be claimed to cover at least a portion of the features and/or attributes of the product. The service provider performs an evaluation of the 25 third-party patents, assessing their relative value based on a cost-effective analysis of factors including, for each patent in the IRG: (i) likelihood that the patent would withstand an invalidity challenge; (ii) likelihood that the product would be found to infringe the patent; and (iii) cost of redesign of the product to avoid infringement of any of the claims within the patent. The service provider determines that the reasonable return to the third-party patent owners would be 25% of operating profits (i.e., Earnings Before Interest, Taxes, Depreciation, Amortization and Rent ("EBITDA") for the product—that is, 25% of the operating profits. Operating profits for the product are estimated at $100 million per year, so that the aggregate assessed return to third-party patent owners is $25 million per year. Manufacturer then agrees to pay this amount annually into a "patent royalty" account maintained and administered by the service provider. The service provider then advertises an opportunity for the owners of 25 patents in the IRG to seek a share of the product licensing payments. Notice may be provided to known patent owners by certified mail and to others by publication such as in a newspaper.

Assuming that owners of ten of the 25 third-party patents elect to participate in the licensing offer, and assuming that each of the "participating" patents is of average value to the product—that is, each accounts for ½5th of the aggregate value of the IRG—each of the ten participating patent owners licenses its patent to manufacturer for ½5th of the $25 million annual return to patent inputs, or $1 million annually. Payments to participating patent owners could be set in dollar terms (based on projected operating profits) as in the example, or as percentages of annually determined revenues. The manufacturer pays/assigns the remaining 15 "points" (representing $15 million or 15% of the operating profit) to an insurer (together with, in some embodiments, an additional risk premium) for indemnification and defense protection against future claims. An insurer, which may or may not be the same entity as service provider, will thereafter be able to show, through the above process, an "established rate" of $1 million per average patent (scored as above). Further, the service provider will likely be able to reduce litigation costs/threats through attaching formal Fed. R. Civ. P. Rule 68 Offers of Judgment to any settlement offer it makes. As such, the manufacturer protects itself against patent infringement liabilities, and the service provider is able to make a profit based on insurance risk calculations.

In a second example, an entity approaches a service provider with details of a new product or service. The service provider (which, in some embodiments, also includes an insurer) conducts a search and analysis of third-party patents that could be claimed to cover the new product or service (or any portions thereof). The service provider calculates a total fair royalty and provides notice to the owners of the potentially covering patents of the entity's willingness to pay licensing fees from the aggregate fair royalty. The entity pays an allocated portion of the fair royalty to any owners of patents potentially covering the new product or service that accept such an offer. The entity pays an insurance premium to an insurance provider. The insurance premium is provided in exchange for insurance coverage in the event that a claim for patent infringement is made against the insured and the insured is found liable for damages to a patent owner who did not accept the original royalty offer or who was identified only after the original royalty offer was made.

Figure 7:
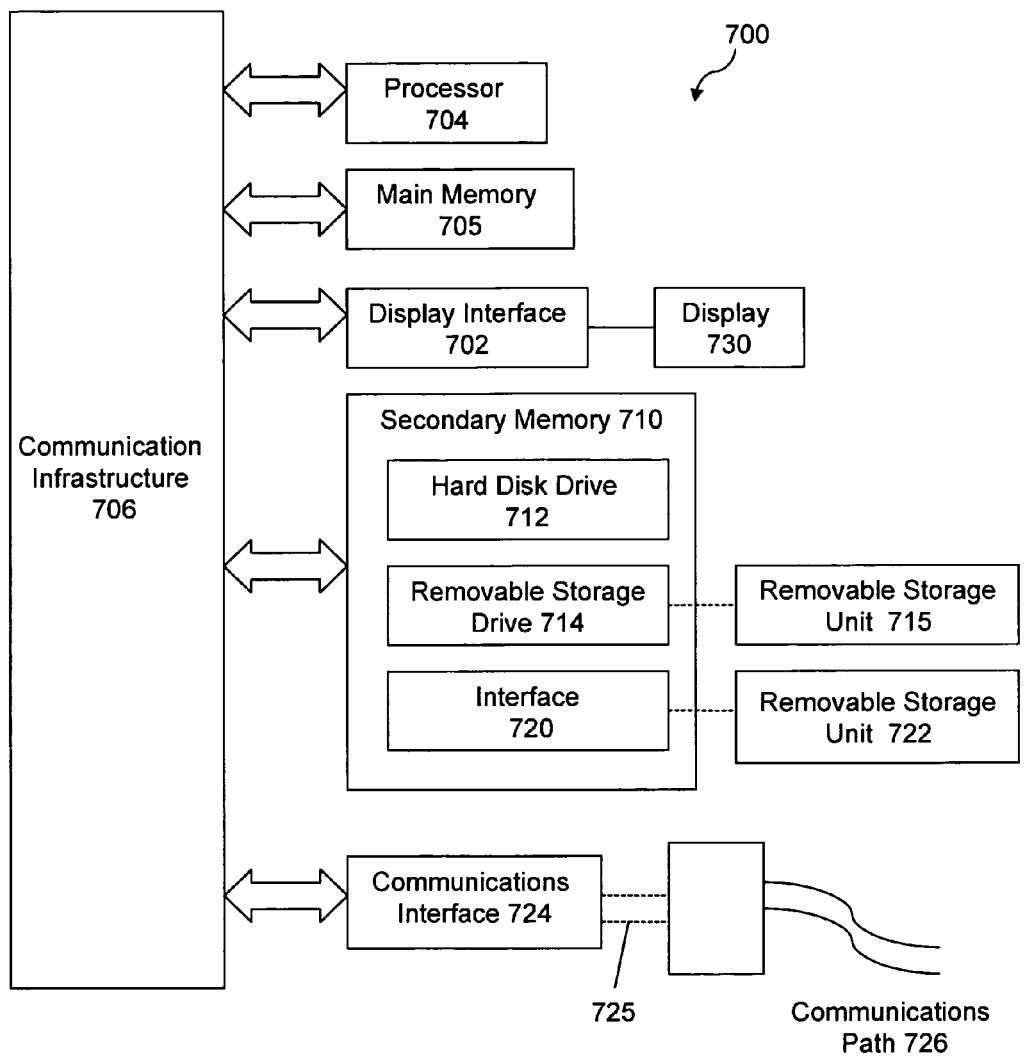
FIG. 7 illustrates an exemplary computer system in which the presented methods may be implemented as computer-readable code.

One or more computer systems, or network architectures, may be used to carry out the methods described herein. FIG. 7, for example, illustrates an exemplary computer system 700, in which the methods presented herein may be implemented as computer-readable code. After reading the following description, it will become apparent to a person skilled in the relevant art how to program and implement the invention using available computer systems and/or computer or network architectures.

FIG. 7 illustrates one or more processors, such as processor 704. Processor 704 may be a special purpose or a general purpose digital signal processor. Processor 704 is connected to a communications infrastructure 706 (for example, a bus or network). Computer system 700 may include a display interface 702, also connected to communications infrastructure 706, which forwards graphics, text, and other data from the communication infrastructure 706 (or from a frame buffer not shown) to display unit 730. Computer system 700 also includes a main memory 705, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, etc. Removable storage drive 714 reads from and/or writes to a removable storage unit 715 in a well known manner. Removable storage unit 715, represents a floppy disk, magnetic tape, optical disk, etc., which is read by and written to by removable storage drive 714. As will be appreciated, the removable storage unit 715 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, wired or wireless systems, etc. Software and data transferred via communications interface 724 are in the form of signals 725 which may be electronic, electromagnetic, and optical or other signals capable of being received by communications interface 724. These signals 725 are provided to communications interface 724 via a communications path 726. Communications path 726 carries signals 725 and may be implemented using wire or cable, fiber optics, a phone line, a cellular phone link, a radio frequency ("RF") link and other communications channels.

The terms "computer program medium" and "computer usable medium" are used herein to generally refer to media such as removable storage drive 714, a hard disk installed in hard disk drive 712, and signals 725. These computer program products are means for providing software to computer system 700.

Computer programs (also called computer control logic) are stored in main memory 705 and/or secondary memory 710. Computer programs may also be received via communications interface 724. Such computer programs, when executed, at least in part, enable the computer system 700 to implement the methods presented herein. In particular, the computer programs, when executed, at least in part, enable the processor 704 to implement the methods presented herein. These methods may be performed automatically, or may be invoked by some form of manual intervention. Accordingly, such computer programs represent controllers of the computer system 700. Where the methods are implemented using software, the software may be stored in a computer program product and loaded into computer system 700 using removable storage drive 714, hard drive 712 or communications interface 724. In implementation, the software and/or computer system 700 described may perform any one of, or any combination of, the steps of any of the methods presented herein.

The invention is also directed to computer products (also called computer program products) comprising software stored on any computer useable medium. Such software, when executed, at least in part, in one or more data processing devices, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

While various embodiments of the presented method have been described, it should be understood that they have been presented by way of example, and not limitation. It will be apparent to a person skilled in the relevant art that various alternatives may be incorporated within the presented method without departing from the spirit and scope of the invention. Thus the present invention should not be limited by any of the above-described exemplary embodiments.

What is claimed is:

1. A method for managing exposure to monetary liability for patent infringement by a product or a service through a computer system, comprising the steps of:

performing a patent search executed by use of instructions stored in a computer readable storage medium to identify an infringement relevancy group, wherein the infringement relevancy group includes at least a first patent and a second patent;

determining a total fair royalty for the product or the service executed by use of instructions stored in the computer readable storage medium;

allocating the total fair royalty among the at least the first patent and the second patent in the infringement relevancy group executed by use of instructions stored in the computer readable storage medium to determine a willing fair royalty for the first patent;

offering the determined willing fair royalty to an owner of the first patent;

receiving a premium for an intellectual property damages insurance policy from a manufacturer of the product or the service, wherein the premium for the intellectual property damages insurance policy is based on the owner of the first patent refusing the willing fair royalty of said offering step, the intellectual property damages insurance policy determined by performing an intellectual property Value-at-Risk assessment to identify risks related to intellectual property and instituting process and control to manage the risks related to the intellectual property, the Value-at-Risk assessment including use of a database of issued patents, a database of pending patents, and a calculation of a patent-based maintenance value.

2. The method of claim 1, wherein the intellectual property damages insurance policy indemnifies patent infringement damages liability owed to the owner of the first patent.

3. The method of claim 1, wherein the intellectual property damages insurance policy indemnifies patent infringement damages liability owed to an owner of a patent not in the infringement relevancy group.

4. The method of claim 1 further comprising the step of assessing the validity of the first patent.

5. The method of claim 1 further comprising the step of requesting the determined total fair royalty from the manufacturer of the product or the service, wherein said requesting step does not identify each of the patents of the infringement relevancy group.

6. The method of claim 1, wherein the intellectual property damages insurance policy is provided by an intellectual property umbrella captive.

7. The method of claim 1, further comprising the step of employing at least one of a sale transaction and a leaseback transaction.

8. The method of claim 1, further comprising the steps of:
creating an intellectual property umbrella captive; and
reinsuring the intellectual property umbrella captive.

9. A method for managing exposure to monetary liability through a computer system for patent infringement by a product or a service, comprising the steps of:

performing a patent search by use of instructions stored in a computer readable storage medium to identify on a user interface an infringement relevancy group, wherein the infringement relevancy group includes at least a first patent;

determining a first willing fair royalty for the first patent by use of instructions stored in a computer readable storage medium;

displaying the first willing fair royalty on the user interface;

submitting as an offer the first willing fair royalty to a first owner of the first patent by use of instructions stored in a computer readable storage medium;

accepting a rejection of the offer of the first willing fair royalty by the first owner of the first patent by use of instructions stored in a computer readable storage medium;

receiving the first willing fair royalty as a premium for an insurance policy from a manufacturer of the product or the service, wherein the insurance policy indemnifies damages based on infringement by the product or the service of at least the first patent by use of instructions stored in a computer readable storage medium; and calculating a premium for the insurance policy by use of instructions stored in a computer readable storage medium, wherein the premium for the insurance policy is based on the owner of the first patent refusing the willing fair royalty of said offering step, the insurance policy determined by performing an intellectual property Value-at-Risk assessment to identify risks related to intellectual property and instituting process and control to manage the risks related to the intellectual property, the Value-at-Risk assessment including use of a database of issued patents, a database of pending patents, and a calculation of a patent-based maintenance value.

10. The method of claim 9, wherein the infringement relevancy group includes at least a second patent, the second patent having at least one claim covering the product or the service, the method further comprising the steps of:
determining a second willing fair royalty for the second patent; and
illustrating the second willing fair royalty on the user interface.

11. The method of claim 10, further comprising the step of offering the second willing fair royalty to a second owner of the second patent.

12. The method of claim 10, wherein the second willing fair royalty is the same as the first willing fair royalty.

13. The method of claim 11, wherein the insurance policy has a policy coverage limit based on the second owner accepting the second willing fair royalty and the insurance policy indemnifies damages based on infringement by the product or the service of the second patent.

14. The method of claim 10, further comprising the step of receiving a total fair royalty from the manufacturer of the product or the service, the total fair royalty including at least the first willing fair royalty and the second willing fair royalty.

15. The method of claim 9, wherein the insurance policy indemnifies damages based on infringement by the product or the service of a second patent, the second patent is not in the infringement relevancy group.

16. The method of claim 9, further comprising the step of assessing the validity of the first patent.

17. The method of claim 9, wherein the insurance policy has a policy coverage limit based on insurance risk calculations.

18. The method of claim 9, wherein the insurance policy is provided by an intellectual property umbrella captive.

19. The method of claim 9, further comprising the step of employing at least one of a sale transaction and a leaseback transaction.

20. The method of claim 9, further comprising the steps of:
creating an intellectual property umbrella captive; and
reinsuring the intellectual property umbrella captive.

21. The method of claim 1, wherein the intellectual property damages insurance policy has a policy coverage limit based on insurance risk calculations.

22. The method of claim 1 further comprising the step of performing an intellectual property Value-at-Risk assessment to identify risks related to the product or the service by reviewing one or more selected from an assessment group comprising of: licenses, cross licenses, nondisclosure agreements, non-compete agreements, joint ventures, partnerships, patent-based maintenance value calculations, threats to an intellectual property portfolio, inventory of intellectual property assets, strategic objectives for an intellectual property portfolio, policies related to patentability, policies related to intellectual property protection, protocols for open claims, utilization of current insurance assets, management of intellectual property counter-party risks, directors' and officers' risks, and error and omissions risks.

23. The method of claim 9 further comprising the step of performing an intellectual property Value-at-Risk assessment to identify risks related to the product or the service by reviewing one or more selected from an assessment group comprising of: licenses, cross licenses, nondisclosure agreements, non-compete agreements, joint ventures, partnerships, patent-based maintenance value calculations, threats to an intellectual property portfolio, inventory of intellectual property assets, strategic objectives for an intellectual property portfolio, policies related to patentability, policies related to intellectual property protection, protocols for open claims, utilization of current insurance assets, management of intellectual property counter-party risks, directors' and officers' risks, and error and omissions risks.

24. The method of claim 1, wherein said determining step further comprises the step of considering one or more selected from a group comprising of: actual revenue generated from a sale of the product or the service, expected revenue generated from a sale of the product or th service, actual revenue generated from a licensing of the product or the service, expected revenue generated from a licensing of the product or the service, actual profit generated from a sale of the product or the service, expected profit generated from a sale of the product or the service, actual cost of the product or the service, estimated cost of the product or the service actual sale price of the product or the service, estimated sale price of the product or the service, number of patents covering the product or the service, type of intellectual property embodied in the product or the service, one or more of the number of patents covering the product or the service, an established royalty for one or more comparable patents, an established royalty for a comparable product or a comparable service, and a fair maximum potential liability for the product or the service.

25. The method of claim 9 wherein said determining step further comprising the step of considering one or more selected from a group comprising of: actual revenue generated from a sale of the product or the service, expected revenue generated from a sale of the product or the service, actual revenue generated from a licensing of the product or the service, expected revenue generated from a licensing of the product or the service, actual profit generated form a sale of the product or the service, expected profit generated from a sale of the product or the service, actual cost of the product or the service, estimated cost of the product or the service, actual sale price of the product or the service, estimated sale price of the product or the service, number of patents covering the product or the service, type of intellectual property embodied in the product or the service, one or more of the number of patents covering the product or the service, an established royalty for one or more comparable patents, an established royalty for a comparable product or a comparable service, and a fair maximum potential liability for the product or the service.

* * * * *